United States Patent [19]
Edwards et al.

[15] 3,670,064
[45] June 13, 1972

[54] FORMING PRECISE REINFORCED RECESSES IN THERMOPLASTIC FOAMS

[72] Inventors: Clarence K. Edwards, 865 Morrison Street; Lawrence D. Edwards, 2816 Rosemont Avenue, both of Medford, Oreg. 97501

[22] Filed: Nov. 4, 1969

[21] Appl. No.: 873,953

[52] U.S. Cl. ............................ 264/130, 264/321, 264/322
[51] Int. Cl. ............................................................ B29d 27/00
[58] Field of Search ............................................ 264/321, 130

[56] References Cited

UNITED STATES PATENTS

| | | | |
|---|---|---|---|
| 2,693,007 | 11/1954 | Rhodes | 264/130 X |
| 2,722,719 | 11/1955 | Altstadter | 264/321 X |
| 3,374,301 | 3/1968 | Engles | 264/130 X |
| 3,406,234 | 10/1968 | Bailly | 264/321 X |
| 3,412,185 | 11/1968 | Kienzle | 264/130 X |
| 3,432,380 | 3/1969 | Weber | 264/321 X |
| 3,530,213 | 9/1970 | Belle | 264/321 X |

*Primary Examiner*—Robert F. White
*Assistant Examiner*—Richard R. Kucia
*Attorney*—Clarence M. Crews

[57] ABSTRACT

The invention relates to a novel method for making improved packaging components of thermoplastic foam. Recesses of predetermined size, shape and depth are pressed into sheets of the foam material by the combined effect of a die or hob structure maintained at a temperature which will not melt, but will substantially soften the material, such structure being forced into the material by a pressure which would be inadequate to effect penetration if the material were not progressively softened as the die advances. Each work piece is pre-coated on the face to be recessed with an appropriate release agent. The lateral walls of the recess are protected against heat shrinkage by limitation of temperature and by speed of penetration together with limitation of lateral die area. The material displaced by recess formation is all usefully employed through fusion and condensation to reinforce the wills of the components in the very areas where they are thinned and where the merchandise is to be nested in them.

4 Claims, 7 Drawing Figures

INVENTORS: CLARENCE K. EDWARDS
LAWRENCE D. EDWARDS
BY: *Their attorney*

INVENTORS: CLARENCE K. EDWARDS
LAWRENCE D. EDWARDS
BY: Clarence M. Crews
Their attorney

FORMING PRECISE REINFORCED RECESSES IN THERMOPLASTIC FOAMS

The packaging components of foam material and the machine for making packaging components disclosed in this specification are not claimed herein, but they are claimed respectively in divisional applications Ser. No. 194,229 and Ser. No. 194,146, both filed Nov. 1, 1971.

This invention relates to packaging components, more particularly to packaging components made from materials of the aerated thermoplastic type, and their manufacture. Such materials are generally referred to as foams and consist, as a rule, of numberless small beads, cells or bubbles of thermoplastic material, such as polystyrene, united into a homogeneous mass. A package in which such material is used generally includes two complementary, firm but cushioning sections of stable configuration, having flat confronting surfaces in marginal areas and optionally in some interior areas, but formed with one or more opposed cavities or recesses which fit and contain portions of the object or objects being shipped. The composite foam structure may completely enclose the merchandise, or the two components may be spaced far apart if the contained merchandise is adapted to space them in definitely fixed relation to one another when placed in a carton of appropriate size and shape.

The primary purpose of these components is to cushion the merchandise while providing a definite compartment for each item, in which the item is at least partially confined, and providing exteriorly a composite organization of fixed dimensions, adapted to fit snugly into an enclosing carton.

The foams are generally light, weighing in the neighborhood of one to three pounds per cubic foot, but sometimes considerably more. They hold their shapes, and, when made in accordance with the present invention, stand up under rough usage.

The formation of the foam materials into packaging components presents unique problems because of the nature of the material. The material when subjected to heat does not have a definite melting point. For each material there is a temperature at which it starts to soften, then, as the temperature rises, to lose shape and to become sticky and somewhat fluid. If a source of heat sufficiently intense to melt nearby material is brought near enough to melt the skins of the outer beads and collapse the beads, the cellular material appears to recoil and shrink as one bead layer after another is reduced to a fluid state. When such a condition is allowed to last for any substantial time, sharp definition and accurate shaping are not possible in the affected area.

Up to the present time there have been three methods of making packaging components of foam material. The first two are slow, costly as regards labor, and produce components which are weak in the thinned areas. As a consequence the resulting components have been expensive to make and, for some services at least, deficient in performance. Components made by such methods have not, therefore, been economically available in some instances, and/or have not had the required durability and strength.

The first of these methods is performed in an expensive mold of the kind used for die casting, but because of the nature of the material employed the process does not resemble die casting at all. Instead of injecting molten material into a chilled cavity to solidify, bubbles are blown cold into the cold cavity. Steam is then injected into the mold to heat the mold and to soften the beads and make them tacky so they will adhere to one another. The steam also expands the bubbles, making the product lighter than it would otherwise be. The mold and its contents are then cooled to about 80° F. and the resulting component is removed. This is a very slow and time consuming cycle, involving high labor cost and expensive equipment, long heating, cooking and cooling periods, and an extravagant utilization of steam under pressure. The product is of uniform composition and density throughout and therefore of uneven strength, being weakest where the recesses or cavities cause the walls to be thinnest.

The second procedure does not involve the use of heat. A flat sheet of foam material of uniform thickness is provided as the work piece and the material is routed out in the areas where the cavities are to be provided.

Starting material for this purpose can be provided at moderate cost, either by a continuous extrusion process or by the molding of large, thick blocks which are then sliced into slabs or sheets of the desired thickness. A typical block may measure 4 feet by 8 feet by 1 and ½ feet.

The routing out of the material is a slow operation, however, involving much labor expense. Again, the material is of uniform structure and density throughout the finished component, so that the component is weak in the thin areas, the very areas in which the merchandise is to be nested and in which reinforcement is most needed.

The third method also starts with a flat sheet of foam material of uniform thickness. It is a cold compression method which has limited uses at best. It requires the application of such a high pressure that even the unrecessed face may be seriously impaired, particularly in the thinned areas. It is inapplicable to most of the foam materials because the materials have enough resiliency immediately to recover more or less, and to tend gradually to recover further, the result being that cavities of predetermined dimensions cannot be dependably formed and maintained. Again the resulting component is not reinforced in the thinned areas.

We have contrived a novel apparatus and method which, because of reduced labor cost, reduced cost of dies and other equipment, and increased dependability, reduces the cost of production of thermoplastic foam type packaging components by at least 50 to 67 percent, while improving the product significantly.

The starting material is desirably a foam sheet or slab of moderate, and desirably uniform thickness. In the areas to be recessed the material is pressed between a heated die and a sheet holder under a limited constant pressure which would be insufficient to cause the unheated die to penetrate the material over any substantial area. The die is, however, maintained at a temperature sufficiently elevated to soften the surface material and cause it to become tacky but not freely fluid. Penetration progresses only as the material in the die contacted area becomes soft enough to yield under the limited pressure which is applied.

The material, whose softening or fusion permits the die to penetrate, is flowed under pressure to form a skin reinforcement in the nesting or thinned areas. All the original foam material is thus preserved and put to use in strengthening the thinned areas, so that a superior product results.

When the die has penetrated the foam material to the desired depth, a tripper reverses the relative movement of the die and the sheet holder, leaving the finished component in the holder. There is no alternate heating and cooling of the die, and while the rate of die penetration may vary a little with slight variations of temperature which may occur, the complete loading, operating and unloading cycle runs to about 25 to 30 seconds, not more than 1/12 the time required for the complete forming cycle by the method first outlined above. As many components may be made simultaneously as the chosen size of the press will permit. The product is uniformly sharply formed to the desired outlines, the percentage of rejects being very small.

It is essential to the invention that a molding press be provided effective to form desired, sharply defined, cavities or recesses in sheeted foam material through a combination of limited predetermined pressure together with limited predetermined heat softening and fusion.

It is also essential that the molding press of the kind referred to shall comprise a heated platen to which dies or hobs of various designs and contours may be selectively applied. Dies of this kind can be furnished at a small fraction of the cost of dies of the kind required in carrying out the method first outlined above. There are no cooling jackets, no passages for coolant, no passages for steam injection, no complicated patterns to contrive. In other words, the apparatus is reduced to that required for simple hot pressure molding of materials of the kind referred to.

It is important that in the molding press the work holder and the heated die are relatively advanced toward one another at a rate controlled by the combined effect upon the work piece of sufficient heat to produce progressive, gradual fusion as the die advances and under a limited pressure, until a predetermined penetration has been effected, together with means for thereupon reversing the relative movement of the component holder and the die.

It is a still further object to provide a method or procedure for molding cavities in foam material in which the heated die at the conclusion of the stamping stroke is withdrawn cleanly from the formed component without imposing surface damage or damaging strain on the component, through sticking of the component to the die. To this end it is an important point that each blank of sheet material is pre-coated on the die-engaged face with a liquid coating of a suitable release agent. Each blank leaves a slight residual coating of the solids contained in the release agent on the blank engaging die surfaces, and this affects beneficially the release of the next following blank. For sharpness of definition it is important for the release to be effected instantaneously at the point of reversal. The release agent desirably includes water as a vehicle, and this serves effectively to protect the areas not engaged by the die, but closely adjacent to the engaged areas, against possible heat deformation. These areas come out of the machine wet, and, therefore, without having been heated above the boiling point of water.

It is a further object to produce recessed packaging components from sheets of foam material, at less cost, and at the same time of functionally superior quality as compared with foam packaging components heretofore available.

Other objects and advantages will hereinafter appear.

In the drawing forming part of this specification:

THE MACHINE

Figure 1:
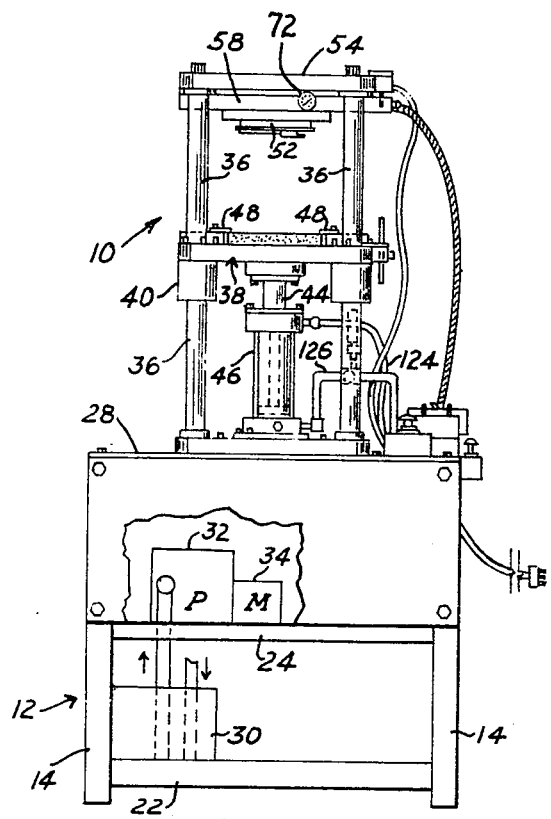
FIG. 1 is a view in side elevation of a molding machine of simple construction, the machine being designed to convert identical sheets of thermoplastic foam material into complementary packaging components through the molding of complementary cavities or recesses therein.
Figure 2:
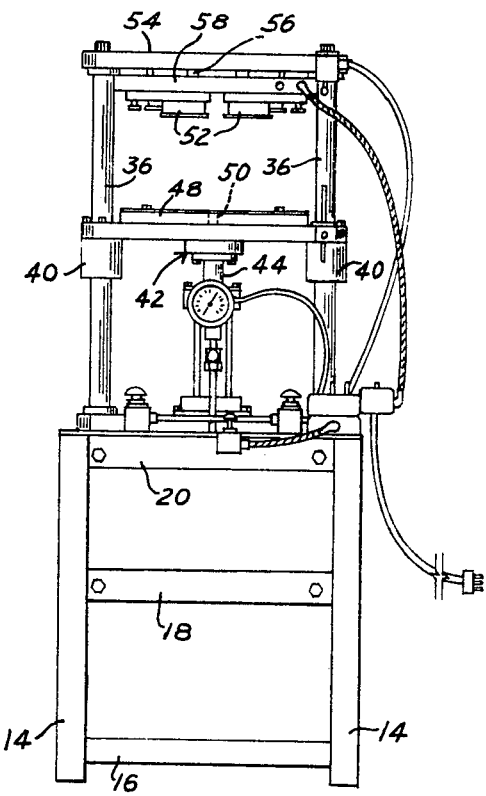
FIG. 2 is a view in front elevation of the machine of FIG. 1.

The machine 10 is fixedly mounted on a rigid framework or table 12. The table 12 comprises vertical legs 14, lower, intermediate and upper longitudinal bars 16, 18 and 20, and lower, and intermediate transverse bars 22 and 24, and an upper transverse bar (not shown).

Beneath the table top 28, the table framework provides support for a hydraulic fluid reservoir or sump 30, a variable volume hydraulic pump 32 and a pump motor 34.

The table top 28 supports four upstanding corner posts 36 upon which a work piece holder and carrier 38 is guided for vertical movement. The carrier 38 normally rests upon collars 40 affixed to the posts 36, and is adapted to be thrust upward by a hydraulic operating ram 42, to which it is attached. The ram 42 is a rigid structure which includes a piston rod 44 that extends downward into a stationary hydraulic cylinder 46.

The work piece carrier 38 has mounted on its upper surface front and rear, overhanging guide members 48, beneath which the margins of two work pieces can be simultaneously manually fitted from opposite sides of the machine by the operator. A partition member 50 divides the space between the front and rear guide members 48 and serves as a stop for limiting the insertion of the work pieces to predetermined positions, so that each will be carried upward in precisely the desired relation to one of two molding dies 52. The molding dies are designed to produce complementary recesses and may, in an appropriate case, be mirror images of one another.

The upper ends of the rods 36 support in fixed position a molding die supporting plate 54, to which, through suitable spacers 56, an electrically heated platen 58 is fixedly attached. The platen 58 is a massive plate having electrical heating elements 60 mounted within it. Each die 52 comprises a mounting plate 62 which is secured to the platen 58 in extensive, heat conducting contact therewith by screws 64. Each die 52 also includes one or more hobbing projections or die components 66 of suitable pattern, detachably connected to its mounting plate 62 by screws 68. The hobbing projections 66 in the illustrative machine are zinc castings, but other metals and alloys such as copper, brass, bronze, stainless steel, aluminum and probably others, so long as they are non-corroding, highly heat conductive, and solid at the operating temperature, would serve.

It is an important point that each hobbing projection is formed on its work engaging surface with a continuous, thin, overhanging lip or peripheral flange 70 of substantial width. The importance of this feature will be made clear presently.

A thermometer 72 is applied to an edge face of the platen and the platen heating means can be set to maintain the platen at substantially a predetermined temperature, or within a narrow predetermined temperature range.

Figure 6:
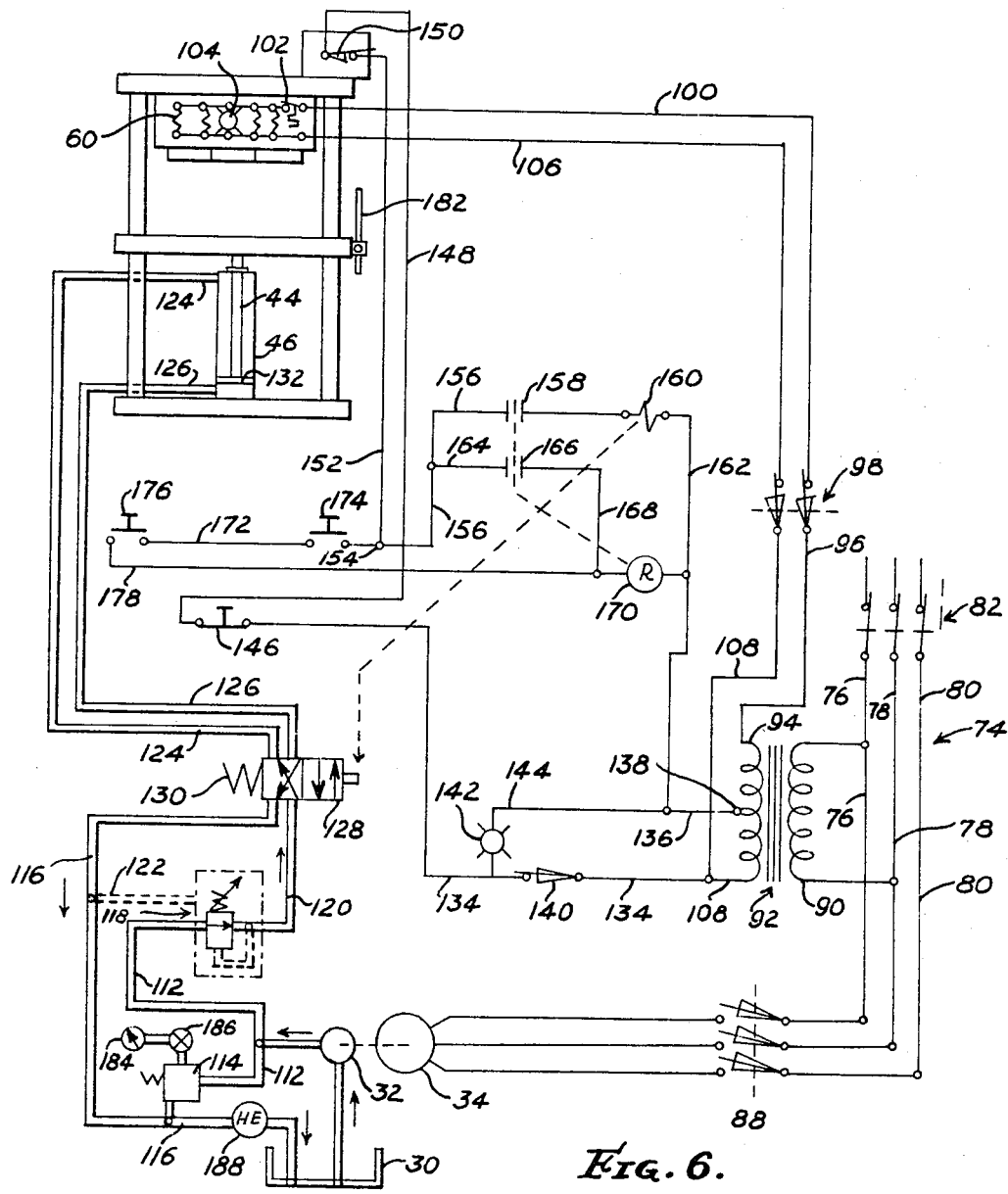
FIG. 6 is a diagrammatic view showing the hydraulic and electrical systems of the illustrative machine.
Figure 7:
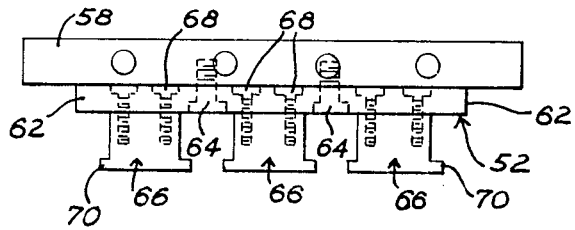
FIG. 7 is an edge view showing the electrically heated platen and composite molding die means affixed thereto, as used in the machine of FIGS. 1, 2 and 6.

The hydraulic and electrical systems of the illustrative machine are diagrammatically shown in FIG. 6.

A three wire A. C. electrical system 74, comprising wires 76, 78 and 80, supplied from a suitable source, is normally open-circuited, but it may be activated through operation of a three pole, single throw master switch 82 to closed position. This makes current available both to the circuit of the pump motor 34 and for other purposes as will be pointed out. Since it is not desired to start the pump until after the platen has been warmed to operating temperature, an on-off switch 88 is provided for controlling only the operation of the pump.

The closing of switch 82 energizes the primary winding 90 of a transformer 92, thereby inducing in the secondary winding 94, having the same number of turns as the primary winding, alternating current of the same frequency and voltage as that flowing in the primary. The induced current may be assumed to have a potential of 240 volts. From the winding 94 a circuit can be traced through a conductor 96, one element of a two pole switch 98, conductor 100 and a settable, thermostatic control 102, to the platen heating resistors 60, which are connected in parallel relation with one another and with a pilot light 104. The return is through a conductor 106, the second element of switch 98 and conductor 108 to the second terminal of secondary winding 94.

The remaining circuitry has to do with the control of the hydraulic system. As soon as the platen has reached the operating temperature (desirably 350° F. when polystyrene foam, which begins to soften at 290° F., is used) the switch 88 is closed and the pump 32 is caused to run continuously. The pump 32 draws hydraulic fluid from the reservoir 30 and delivers it to a conduit 112.

An emergency relief valve 114 interposed between the pressure conduit 112 and a reservoir return conduit 116 is set to become effective at a higher pressure than that for which a regulator 118 is set. The regulator 118 can be set to maintain any desired constant pressure in conduits 112 and 120. Surplus hydraulic fluid is by-passed to the reservoir return conduit 116, through a conduit 122.

The conduits 116 and 120 are, through a solenoid operated slide valve 128, reversibly connected to conduits 124 and 126, which latter conduits are in constant communication, respectively, with the upper and lower ends of cylinder 46. In FIG. 6 the valve is in its normal, idle, right-hand position, a position in which it is normally maintained by a compression coil spring 130. In this position the established connections are such that the hydraulic fluid would be delivered under pressure to the upper end of cylinder 46 through conduit 124 and would drive downward a piston head 132 which forms part of the ram 42, but for the fact that the piston 132 is at the lower limit of its movement, so that no more hydraulic fluid can enter the upper end of the cylinder. All the hydraulic fluid delivered by the pump, therefore, is by-passed by the regulator 118 through conduit 122 to reservoir return conduit 116. The machine, in the condition shown, awaits the introduction of a fresh pair of work pieces into the carrier 38 and the initiation of an electrically controlled cycle of operations by the operator.

The electrical control system includes conductors 134 and 136, the former connected through conductor 108 to the lower terminal of secondary winding 94, and the latter to a center tap 138 of the same winding. The control circuit is, therefore, furnished with one-half the voltage of the heater and pump motor circuits. The control circuit is prepared for operation, but is not put into operation, by the manual closing of a switch 140 which remains closed until it is manually opened. A pilot light 142, interposed in a line 144 which connects 134 to 136, indicates to the operator that the switch 140 stands in its closed position.

The control circuit can be traced from 134 through a normally closed emergency switch 146, thence through a conductor 148, a normally closed switch 150, and a conductor 152 to a terminal 154 at or just after which the circuit comes to a dead end with the parts in the condition in which they are shown in FIG. 6.

From 154 there are two potential return paths to center tap 138 through a conductor 156. One of these paths is through a normally open, relay controlled switch 158, a solenoid winding 160 and a conductor 162, but since the switch 158 is normally open, this path is not directly or immediately available. The other potential path through 156 is through a branch conductor 164, which includes a normally open relay controlled switch 166, a conductor 168, the relay 170 which controls the closing and keeping closed of switches 158 and 166, and the conductor 162. Since the switch 166 is normally open, this path is not directly or immediately available either.

The only path directly available for completing a circuit from terminal 154 to center tap 138 is through a conductor 172, which includes two normally open manual switches 174 and 176, in series with one another. When these two switches are simultaneously manually closed, a circuit is completed through conductor 172, a conductor 178, relay 170 and conductor 162.

The provision of the two switches 174 and 176 in series with one another is a familiar safety expedient. It prevents starting of the press by the accidental closing of one of them, and it keeps both hands of the operator occupied in locations where they are out of harm's way as the press is started.

As has been noted, the closing of switches 174 and 176 causes current to flow through relay 170. This closes switches 158 and 166, causing current to flow through both of these switches. The current which flows through switch 166 flows also through relay 170, thus keeping the relay energized and both switches 158 and 166 closed after the switches 174 and 176 have been permitted to open. The flow of current through solenoid winding 160 is, therefore, also maintained.

Energization of the solenoid winding 160 causes the valve 128 to be thrust toward the left against the resistance of a compression coil spring 130. This reverses the connections of conduits 116 and 120 with conduits 124 and 126, causing hydraulic fluid to be delivered under pressure through conduit 126 to the lower end of cylinder 46 and the hydraulic fluid in the upper end of the cylinder to be discharged through conduit 124.

The piston or ram, therefore, drives the work carrier 38 upward toward the die at a good speed, but not fast enough to deal a damaging blow to the foam material. In fact, if the pressure has been properly chosen and the work carrier were driven up against a cold die having all hob faces disposed in a common plane, the work pieces would not be perceptibly dented. If there is an area in which a small hob projects upward substantially farther than any other, it may penetrate freely until the resistance to penetration is reinforced by the contact with other hobs. The indentation in the small area is stabilized by the softening and condensing of material in that area at greater depths.

With polystyrene foam having a density of 1.5 pounds per cubic foot as the material worked upon, the platen temperature may desirably be set at 350° F. and the pressure at about 8.8 pounds per square inch for the maximum hob area (the hob area at maximum penetration), but both the temperature and the pressure may be raised considerably within the scope of the invention. The pressure here referred to would be the pressure indicated by a gauge 184, multiplied by the cross-sectional area of the piston and divided by the maximum total hob area of the two dies combined. The gauge 184 is connected through a manually operable valve 186 to the conduit 112.

Upon contact of the work pieces with the dies, the advance of the work carrier is slowed down progressively, being permitted to continue only as the softening of the material makes the advance possible.

When the desired limit of penetration has been reached, a vertically adjustable rod 182, mounted on the work carrier, and movable in unison with the carrier, engages and opens the switch 150. This immediately deenergizes the relay 170, causing switches 158 and 166 to open. This, in turn, deenergizes the solenoid winding 160, permitting the valve 128 to be returned to the position of FIG. 6 by the spring 130.

This second reversal of the valve 128 causes the ram or piston, together with the work carrier, to be driven downward hydraulically to the starting positions, where they will remain until a new cycle is initiated by simultaneous manual closing of the switches 174 and 176.

A heat exchanger 188 is interposed in the return conduit 116 for cooling the hydraulic fluid on its way back to the reservoir. This not only keeps the fluid cool, but maintains it as a desired, substantially uniform viscosity.

If all has gone well the operator can, upon the return of the work carrier to the normal, lower position, extract from the carrier two perfect, sharply defined, packaging components. That all will go well can be quite definitely assured if the temperature and pressure are properly adjusted to the material employed, and the particular pattern sought to be impressed, and if certain other precautionary measures are given due attention. The percentage of rejects is very small when all of these factors are properly attended to.

Figure 3:
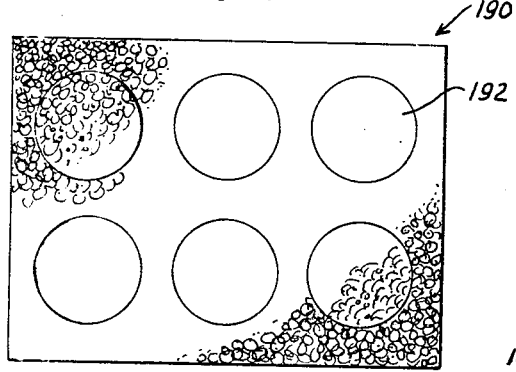
FIG. 3 is a plan view of a packaging component formed with circular recesses for use in shipping canned goods.
Figure 5:
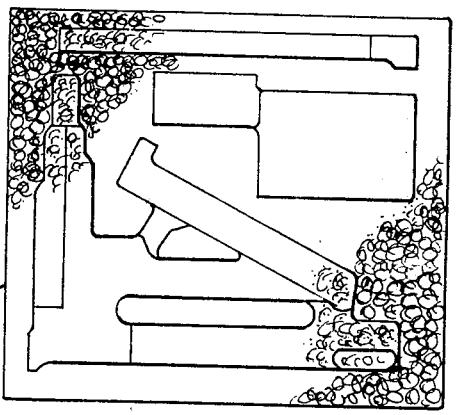
FIG. 5 is a plan view of one of two complementary formed components which, when brought together form suitable closed compartments for completely enclosing a stapler and certain accessories and/or supplies.
Figure 4:
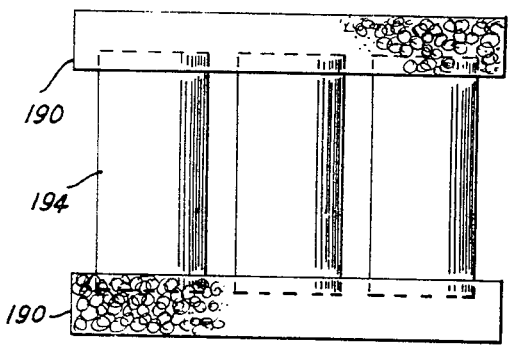
FIG. 4 is a view in elevation showing two components of the kind illustrated in FIG. 3, the components being associated with opposite ends of a suitable number of cans in an assembly which will snugly fit within a rectangular carton of appropriate dimensions.

Two component patterns are disclosed in FIGS. 3 and 5, and a package group utilizing two of the FIG. 3 components is shown in FIG. 4.

The component 190 of FIG. 3 consists of a rectangular sheet, about 1 inch thick and having six circular recesses 192 of equal depth, about ½ inch, formed in it, the recesses being arranged in rows and columns, two by three. Six cans 194 of the same diameter as the recesses are placed in the recesses of the lower component of FIG. 4 and the upper component is then fitted onto the upper ends of the cans. This assembly can be put together inside a carton of suitable size, and the carton then closed. Alternatively, the assembly may be transferred into a carton after it is otherwise complete. This type of package has been found to be very useful for shipping canned goods without damage.

The component 196 of FIG. 5 is designed to be used in conjunction with a like, complementary component for shipping a stapler together with certain accessories and/or supplies. Different portions of this merchandise require recesses of different depths and they are provided by providing hobs of different thicknesses, which penetrate to different depths, or hobs of varying thickness. These components fit together face to face with the stapler and other contents completely enclosed.

THE METHOD

The chief difficulties to be guarded against are:
1. The employment of inadequate or excessive heat, and the employment of inadequate or excessive pressure.
2. Heat damage to the unimpressed surfaces of the work pieces which border the recesses, i.e., shrinkage.
3. Shrinkage of the lateral faces of the formed recesses through exposure to excessive heat.
4. Failure to secure prompt, easy and complete release of the work pieces by the dies, and the prompt withdrawal of the work pieces at the conclusion of the forming operation.

The temperature employed depends primarily on the material used, and only to a slight degree upon the density of the material. It should be definitely above the temperature at which the material begins to soften but substantially below the temperature at which the material becomes freely fluid. A suitable platen temperature for use with the most commonly used foam, polystyrene, is 350° F. This temperature is not necessarily optimum under all conditions, but it is within a practical and operative range. The less the pressure employed for a given material, the higher the temperature will have to be, and the greater will be the likelihood of heat damage.

For a given material the pressure will vary chiefly with density. As a general guide, a complete cycle of the machine, including unloading and loading time, should be under 30 seconds, and preferably within about 25 seconds. With the temperature determined and maintained, the pressure may be adjusted to obtain the optimum timing consistent with good results.

The thin but rather wide marginal overhangs 70 provided on the faces of the hobs protect effectively against heat damage to the lateral faces of the recesses, if the temperature employed is not excessive, and the pressure employed is sufficient to keep the carrier moving and assure the prompt completion of the molding cycle.

It has been found impossible to secure consistent release of the formed components by the dies at the conclusion of the forming operation without resort to the employment of a release agent. Ready release could be assured by generously spraying the faces of the dies after each cycle with a silicone release agent, but that would be an expensive procedure, both from the standpoint of labor and material.

We have found the following procedure to be most satisfactory and dependable:

At the very start of operations the dies are sprayed with a silicone release agent. The work pieces of each pair, including the very first pair, and dipped in a release agent mixture described below. These dipped faces may be rubbed together for some little time, say about ten seconds, and they are then put into the machine, and the forming cycle of the machine, as described above, is executed. While the machine cycle is in progress the next pair of work pieces is dipped and rubbed. Alternatively, the release agent may be sprayed onto the faces of the work pieces. Each pair of pieces apparently leaves a residual deposit or coating of stearate on the dies, which is beneficial in assuring the complete and clean separation of the following pair of work pieces. If the application of the release agent is dispensed with, three or four more pairs will release, but with progressively deteriorating results, and then sticking will occur.

The release agent which we have found most advantageous is made up as follows, the "parts" referred to being parts by weight.

In 1,000 parts of water, 8.6 parts of "Tide" detergent were dissolved, and 88 parts of zinc stearate were then stirred in. Varied percentages would be operative, but this one has been developed as a result of an extended and persistent exploration and is considered most practical from the standpoint of cost and performance. The high water content of the release agent is considered advantageous, both because it limits the consumption of the other ingredients to economical operative levels, and because it effectively protects the work piece margins which border the recesses, against heat damage which might otherwise result from proximity of these surfaces to the backing plate. The release agent mixture should be stirred from time to time.

THE PRODUCT

The machine and method described produce an integral packaging component at one-third to one-half the cost of the most nearly similar packaging component of the prior art. Such prior art packaging components do not, however, closely approach in quality the product of our machine and method. In our product all of the foam material displaced by the recess forming operation is changed to a semi-fluid state and is fused and condensed into the wall portions which are thinned by the recess formation, serving thereby materially to reinforce the thinned portions of the walls, the portions in which the merchandise is nested, and which are most in need of reinforcement. No packaging component of the prior art has this characteristic. The possession of this characteristic is dependent upon the machine and the method by which the packaging component is produced.

These components, because of their reduced cost and increased strength, open up extensive new practical fields of use for packaging components of the thermoplastic foam type.

We have described what we believe to be the best embodiments of our invention.

We claim:

1. The method of simultaneously die molding a plurality of recesses into an integral packaging component of the thermoplastic foam type from a sheeted work piece of thermoplastic foam which comprises forcing a die which is equipped with a plurality of heated, forming hobs, each having a thin peripheral flange at its leading end, rectilinearly into the work piece in direct contact therewith, under a limited pressure which would be insufficient to effect significant penetration of the material by the die in an unheated state, while maintaining the die temperature in the heat-softening temperature range of the thermoplastic foam material with which it is engaged, so that the rate of penetration is made to depend upon the rate of fusion of the foam material, with the consequence that at the conclusion of the recessing operation substantially all of the material displaced by the recessing will have been combined through fusion and condensation into the portion of the component which has been thinned by the recessing, to reinforce and strengthen such thinned portion, and that the side walls of the resulting recesses will be sharply defined and free from heat-shrinkage distortion.

2. The method of die molding an integral, recessed packaging component of the thermoplastic foam type as set forth in claim 1 which further includes the preliminary coating of the face of the foam work piece which is to be directly engaged and fused by the die with a suitable release agent, whereby the die and the recessed component are caused to leave contact with one another readily and without imposing damaging strain upon the recessed component.

3. The method of forming a recessed packaging component of the thermoplastic foam type as set forth in claim 2 in which the release agent employed is carried in water as a vehicle, the water serving also in the areas not actually engaged by the die to limit heating of the work piece surface in such areas, thereby to prevent heat damage to the surface in such areas.

4. The method forming a recessed packaging component of the thermoplastic foam type as set forth in claim 2 in which the release agent applied consists essentially of water as a vehicle, a detergent and zinc stearate in the proportions by weight of substantially 1,000 parts water to 8.5 parts detergent to 88 parts zinc stearate.

* * * * *